US012652710B2

(12) United States Patent
Dong

(10) Patent No.: US 12,652,710 B2
(45) Date of Patent: Jun. 9, 2026

(54) METHOD FOR COMMUNICATION UNDER MULTIPLE LINKS, ELECTRONIC APPARATUS, AND NON-TRANSITORY COMPUTER-READABLE STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 310 days.

(21) Appl. No.: 18/263,734

(22) PCT Filed: Feb. 3, 2021

(86) PCT No.: PCT/CN2021/075117
§ 371 (c)(1),
(2) Date: Aug. 1, 2023

(87) PCT Pub. No.: WO2022/165680
PCT Pub. Date: Aug. 11, 2022

(65) Prior Publication Data
US 2024/0098812 A1     Mar. 21, 2024

(51) Int. Cl.
*H04W 76/11*          (2018.01)

(52) U.S. Cl.
CPC ................................... *H04W 76/11* (2018.02)

(58) Field of Classification Search
CPC ..................................................... H04W 76/11
See application file for complete search history.

(56) References Cited

U.S. PATENT DOCUMENTS

| | | |
|---|---|---|
| 2018/0103073 A1 | 4/2018 | Rosenberg et al. |
| 2018/0206190 A1* | 7/2018 | Cherian ................ H04L 1/1621 |
| 2018/0206284 A1 | 7/2018 | Zhou et al. |
| 2022/0124855 A1* | 4/2022 | Hu ......................... H04W 76/34 |
| 2022/0248319 A1* | 8/2022 | Yang ..................... H04W 12/08 |
| 2023/0037879 A1* | 2/2023 | Shafin ................... H04W 72/12 |
| 2023/0199551 A1* | 6/2023 | Kim ...................... H04W 76/15 |
| | | 370/229 |

(Continued)

FOREIGN PATENT DOCUMENTS

| | | |
|---|---|---|
| CN | 105580285 A | 5/2016 |
| CN | 107210863 A | 8/2017 |

(Continued)

OTHER PUBLICATIONS

International Search Report issued Sep. 26, 2021 in PCT/CN2021/075117, filed on Feb. 3, 2021, 4 pages (with English Translation).

(Continued)

*Primary Examiner* — Melanie Jagannathan
(74) *Attorney, Agent, or Firm* — Oblon, McClelland, Maier & Neustadt, L.L.P.

(57)          ABSTRACT

A method for communication under multiple links, including determining a first message frame under a link of the multiple links, where the first message frame includes information indicating change of links to which at least one traffic identification (TID) is mapped, and transmitting the first message frame.

17 Claims, 2 Drawing Sheets

AP-MLD                          non-AP MLD

AP1  ⟵ Link 1 ⟶  STA1

AP2  ⟵ Link 2 ⟶  STA2

AP3  ⟵ Link 3 ⟶  STA3

(56)                 References Cited

U.S. PATENT DOCUMENTS

| | | | | |
|---|---|---|---|---|
| 2023/0247698 A1* | 8/2023 | Liu | .................. | H04W 28/0252 |
| | | | | 370/329 |
| 2023/0379986 A1* | 11/2023 | Kishida | ................ | H04W 76/11 |
| 2024/0008039 A1* | 1/2024 | Patil | ...................... | H04W 72/20 |
| 2024/0031929 A1* | 1/2024 | Ryu | ...................... | H04W 48/16 |
| 2024/0195578 A1* | 6/2024 | Zhou | .................. | H04W 72/543 |
| 2024/0276334 A1* | 8/2024 | Nayak | .................. | H04W 24/02 |
| 2025/0088914 A1* | 3/2025 | Ho | ........................ | H04W 36/08 |
| 2025/0254654 A1* | 8/2025 | Antonyraj | ............ | H04W 48/20 |

FOREIGN PATENT DOCUMENTS

| | | | |
|---|---|---|---|
| CN | 107318173 | A | 11/2017 |
| CN | 107950048 | A | 4/2018 |
| CN | 108738098 | A | 11/2018 |
| CN | 109600809 | A | 4/2019 |
| CN | 110519777 | A | 11/2019 |
| CN | 110915256 | A | 3/2020 |
| WO | WO-2021/010663 | A1 | 1/2021 |

OTHER PUBLICATIONS

Combined Chinese Office Action and Search Report issued Mar. 14, 2025 in Chinese Patent Application No. 202180000290.8 (with English translation), 16 pages.

* cited by examiner

AP-MLD                non-AP MLD

AP1 ←——— Link 1 ———→ STA1

AP2 ←——— Link 2 ———→ STA2

AP3 ←——— Link 3 ———→ STA3

Determining a first message frame    〜210

Transmitting the first message frame    〜220

METHOD FOR COMMUNICATION UNDER MULTIPLE LINKS, ELECTRONIC APPARATUS, AND NON-TRANSITORY COMPUTER-READABLE STORAGE MEDIUM

CROSS REFERENCE

The present application is National Stage of International Application No. PCT/CN2021/075117, filed on Feb. 3, 2021, the entire contents of which are incorporated herein by reference in their entireties for all purposes.

BACKGROUND

Technical Field

The present disclosure relates to the field of communications, and more particularly, to a method for communication and an apparatus for communication under multiple links.

Description of the Related Art

The research scope of current Wi-Fi technology includes 320 MHz bandwidth transmission, aggregation and collaboration of multiple frequency bands, etc. It is expected to improve the rate and the throughput by at least four times relative to existing standards, and the main application scenarios are video transmission, AR (Augmented Reality), VR (Virtual Reality), etc.

SUMMARY

According to some embodiments of the present disclosure, there is provided a method for communication under multiple links. The method for communication may include determining a first message frame under a link of the multiple links, where the first message frame comprises information indicating change of links to which at least one traffic identification (TID) is mapped, and transmitting the first message frame.

According to some embodiments of the present disclosure, there is provided a method for communication under multiple links. The method for communication may include receiving a first message frame, where the first message frame includes information indicating change of links to which at least one traffic identification (TID) is mapped, and performing a communication operation according to the first message frame.

According to some embodiments of the present disclosure, there is provided an electronic apparatus. The electronic apparatus includes a memory, a processor, and a computer program stored on the memory and executable on the processor. When the processor executes the computer program, the method as described above is implemented.

According to some embodiments of the present disclosure, there is provided a non-transitory computer-readable storage medium. A computer program is stored on the computer-readable storage medium. When the computer program is executed by a processor, the method as described above is implemented.

BRIEF DESCRIPTION OF THE DRAWINGS

The above and other features of the embodiments of the present disclosure will be more apparent by describing the example embodiments of the present disclosure in detail with reference to the accompanying drawings, in which.

DETAILED DESCRIPTION OF THE PREFERRED EMBODIMENTS

Figures 1, 2:
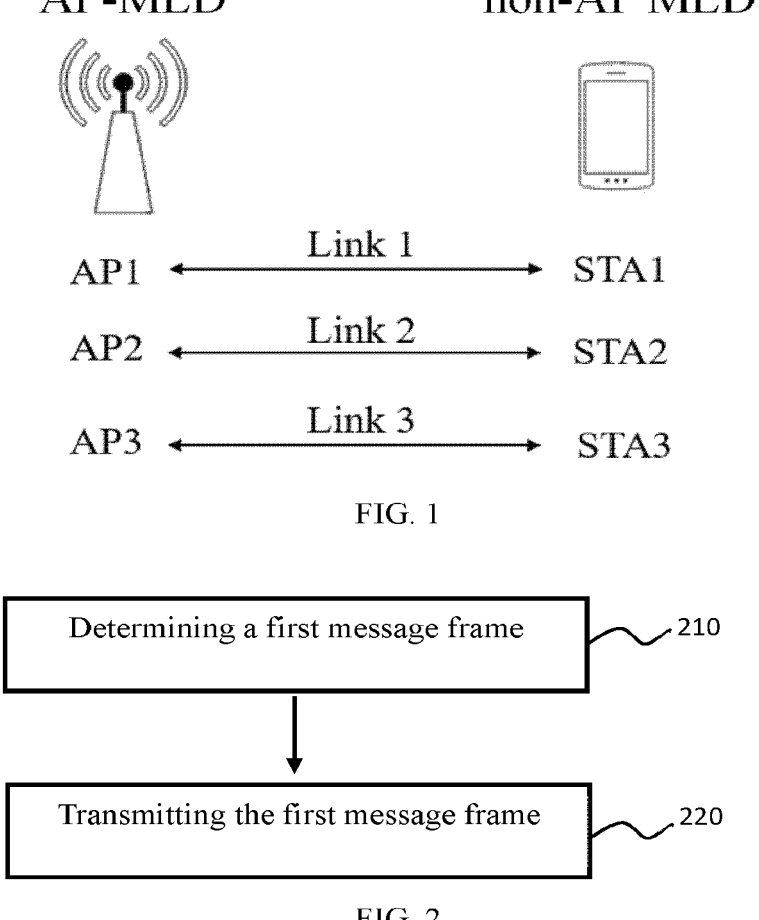
FIG. 1 is an example diagram illustrating a communication scenario under multiple links.
FIG. 2 is a flowchart illustrating a method for communication according to some embodiments of the present disclosure.

The following description is provided with reference to the accompanying drawings to help understanding various embodiments of the present disclosure as defined by the appended claims and their equivalents, thoroughly. Various embodiments of the present disclosure include various specific details, but these specific details are considered as examples only. Furthermore, descriptions of commonly known techniques, functions, and configurations may be omitted for clarity and conciseness.

The terms and words used in the present disclosure are not limited to the written meanings, but are used by the inventors to be able to clearly and consistently understand the present disclosure. Therefore, for those skilled in the art, the description of various embodiments of the present disclosure is provided for purposes of illustration and is not intended for limitation.

It should be understood that the singular forms "a," "one," "said," and "the" used here may also include the plural forms as well, unless the context clearly indicates otherwise. It should be further understood that the phraseology "comprising" used in the present disclosure refers to the presence of the described features, integers, steps, operations, elements and/or components, but does not preclude the presence or addition of one or more other features, integers, steps, operations, elements, components, and/or groups of them.

It will be understood that although the terms "first," "second," and the like may be used here to describe various elements, these elements should not be limited by these terms. These terms are used to distinguish one element from another. Thus, the first element discussed below may be referred to as a second element without departing from the teachings of the example embodiments.

It should be understood that when an element is referred to as being "connected" or "coupled" to another element, it may be directly connected or coupled to other elements, or intervening elements may also be present. In addition, "connected" or "coupled" as used here may include a wireless link or a wireless coupling. As used here, the term "and/or" or expression "at least one/at least one of . . . " includes any and all combinations of one or more of the associated listed items.

Unless otherwise defined, all terms (including technical and scientific terms) used herein have the same meaning as commonly understood by those of ordinary skills in the art to which the present disclosure belongs.

The aggregation and collaboration of multiple frequency bands refer to communications between devices simultaneously in the frequency bands of 2.4 GHz, 5 GHz and 6 to 7 GHz. A new MAC (Media Access Control) mechanism needs to be defined for the communication between devices simultaneously in multiple frequency bands to perform management. In addition, it is also expected that the aggregation and collaboration of multiple frequency bands are able to support low latency transmissions.

The currently studied technology will support the maximum bandwidth of 320 MHz (160 MHz+160 MHz). In addition, it may also support 240 MHz (160 MHz+80 MHz) and other bandwidths.

In the current technology, a station (STA) and an access point (AP) may be multi-link devices (MLD), that is, a function of being able to simultaneously transmit and/or receive under multiple links at a same moment is supported. Therefore, in the current technology, there may be multiple links between the STA and the AP, and the communication between the two devices under multiple links are studied.

In related art, service (data) transmission may be performed between a station multi-link device and an access point multi-link device by using a traffic identification (TID: Traffic Identification)-link mapping mechanism. In the default case, all TIDs will be mapped to all established links. However, since the load under each link is different, and the latency required for each service may be different, if the TID is mapped to all links, a longer access latency may be brought to a link with a high load, increasing the power consumption of the device.

FIG. 1 is an example diagram illustrating a communication scenario under multiple links.

In a wireless local area network, a basic service set (BSS) may be composed of an AP and one or more stations (STA) in communication with the AP. One basic service set may be connected to a distribution system DS (Distribution System) through its AP and then accessed to another basic service set to form an extended service set ESS.

AP is a wireless switch for a wireless network, and a core of the wireless network. An AP device may be used as a wireless base station, primarily a bridge for connecting a wireless network and a wired network. With such an access point AP, the wired network and the wireless network may be integrated.

The AP may include a software application and/or circuitry to enable other types of nodes in the wireless network to communicate with the exterior and interior of the wireless network through the AP. In some examples, as an example, the AP may be a terminal device or a network device equipped with a Wi-Fi chip.

As an example, a station (STA) may include, but is not limited to: a cellular phone, a smartphone, a wearable device, a computer, a personal digital assistant (PDA), a personal communication system (PCS) device, a personal information manager (PIM), a personal navigation device (PND), a global positioning system, a multimedia device, an Internet of Things (IoT) device, etc.

In some embodiments of the present disclosure, the AP and the STA may support a multi-link device, for example, may be respectively represented as an AP MLD and a non-AP STA MLD.

In FIG. 1, as an example only, an AP MLD may represent an access point that supports a multi-link communication function, and the non-AP STA MLD may represent a station that supports a multi-link communication function. Referring to FIG. 1, the AP MLD may work under three links, AP1, AP2, and AP3 as shown in FIG. 1. The non-AP STA MLD may also work under three links, STA1, STA2, and STA3 as shown in FIG. 1. In the example of FIG. 1, it is assumed that the AP1 communicates with the STA1 through the corresponding first link Link 1; similarly, the AP2 and the AP3 communicate with the STA2 and the STA3 through the second link Link 2 and the third link Link 3, respectively. In addition, Link 1 to Link 3 may be multiple links at different frequencies, for example, links at 2.4 GHz, 5 GHz, 6 GHz, etc., or several links of same or different bandwidths at 2.4 GHz, 5 GHz, and 6 GHz. In addition, there may be multiple channels under each link. It will be understood that the number of links between the AP MLD and the non-AP STA MLD is not limited to three shown in FIG. 1, and there may be more or less links according to the configuration of the device and the communication environment.

For ease of description, in the following, an example of communication between one AP and one STA under multiple links (Link 1 to Link 3 as shown in FIG. 1) is mainly described. However, the communication scenario shown in FIG. 1 is an example, and the inventive concept is not limited to this. For example, the AP MLD may be connected to multiple non-AP STA MLDs; or, under each link, the AP MLD may communicate with multiple other types of stations Using a TID-link mapping mechanism, it is possible to enable an AP MLD and a non-AP STA MLD that perform multi-link establishment to determine how a TID is mapped to links established in a downlink (DL) and an uplink (UL). In the case that the TID is mapped to all established links, all established links are activated to transmit services corresponding to the TID. For example, the TID may be mapped to the first link Link 1 to the third link Link 3 shown in FIG. 1, and even if the service corresponding to the TID is transmitted under each link, the first link Link 1 to the third link Link 3 may still be occupied by the mapped TID, causing the access latency of the service data corresponding to a new TID and increasing the power consumption of the device. Embodiments of the present disclosure provide a method for communication and an apparatus for communication under multiple links, so as to at least solve such problems and/or disadvantages.

FIG. 2 is a flowchart illustrating a method for communication under multiple links according to some embodiments of the present disclosure. The method for communication shown in FIG. 2 may be applied to an operation of an initiator, and the initiator may support multiple links (hereinafter referred to as "multi-link"). The initiator may be one of an access point multi-link device (AP MLD) or a station multi-link device (non-AP STA MLD).

Referring to FIG. 2, in operation 210, a first message frame may be determined under any link of the multiple links. According to some embodiments of the present disclosure, the first message frame may include information indicating change of links to which at least one TID is mapped, and the first message frame and the information included in the first message frame will be described in detail later with reference to Table 1. According to some embodiments, one or more TIDs (i.e., at least one TID) may be included, and the links corresponding to each TID may be the same or may be different. According to some embodiments of the present disclosure, the TID may correspond to different upper-layer services and QoS requirements. For example, one or more TIDs may be mapped to the first link Link 1 to the third link Link 3 shown in FIG. 1, and the TID corresponding to each of the first link Link 1 to the third link Link 3 may be the same or may be different.

In operation 220, the first message frame may be transmitted. In some embodiments, according to the configuration of the initiator, the link for transmitting the first message frame may be the same as or different from the link for determining the first message frame, which is not specifically limited in the present disclosure.

According to some embodiments of the present disclosure, in the case that the initiator is an access point multi-link device (AP MLD), the AP MLD may determine the information indicating change of the links to which the at least one TID is mapped, according to the load situation of each link in the multiple links and/or the latency situation of the upper-layer data. For example, when the AP MLD determines that the load of some of the multiple links is high, it may change (delete or modify) these links.

According to some embodiments of the present disclosure, in the case that the initiator is a station multi-link device (non-AP STA MLD), the non-AP STA MLD may transmit the first message frame after the service (data) transmission corresponding to the at least one TID is completed. For example, the first message frame may carry information indicating change (deletion or modification) of links to which the TID that completes transmission is mapped.

According to some embodiments of the present disclosure, the first message frame may be referred to as a tear down frame, however this is an example, and other frames that can be used to transmit the information according to example embodiments (e.g., action frames) are also possible.

In some embodiments, change of the links to which the at least one TID is mapped may refer to deletion of the mapped links, that is, the information, in the first message frame, indicating change of the links to which the at least one TID is mapped may include information indicating deletion of the links to which the at least one TID is mapped.

The format of the first message frame according to some embodiments of the present disclosure may be as shown in Table 1 below.

TABLE 1

| Format of First Message Frame | | | |
|---|---|---|---|
| ID | Initiator Address | Link ID | Timeout |
| Identification bit | Initiator address | Link identification | Timeout |

Referring to Table 1, the first message frame may include an identification bit (ID), an initiator address, a link identification (Link ID), and/or timeout information. It can be understood that each element shown in Table 1 is independently present, and these elements are exemplarily listed in the same table, but do not represent that all elements in the table must exist simultaneously as shown in the table. Among them, the value of each element is not dependent on any other element value in Table 1. Therefore, it can be understood by those skilled in the art that the value of each element in the table of the present disclosure is an independent embodiment. It will be understood that, in the first message frame, some of the content shown in Table 1 may be omitted, or more other content may be included.

According to some embodiments of the present disclosure, the first message frame may include at least one of the following an identification bit (ID), used for identifying the type of the first message frame, an initiator address, used for identifying the address of the device that transmits the first message frame, a link identification (Link ID), used for identifying an identification bit of a link to be deleted in the links to which at least one TID is mapped; for example, the link identification (Link ID) may include at least one link identification, or the link identification (Link ID) may be a link identification group of multiple links, timeout information (Timeout), used for identifying the expiration time of the first message frame.

According to some embodiments of the present disclosure, the first message frame may be identified through the identification bit (ID), for example, as a tear down frame; or, in the case that the first message frame is an action frame, the identification bit (ID) may be an identification bit of an order in the action frame, which may identify that the action frame corresponds to the tear down frame.

According to some embodiments of the present disclosure, the device that transmits the first message frame may be a multi-link device (MLD) and at least one TID may be mapped to multiple links supported by the MLD. Therefore, the initiator address may be an MLD address (rather than an address of each link), that is, the initiator address may be of MLD-level (rather than link-level). However, the present disclosure is not limited to this. In other embodiments, the initiator address may also refer to the address of each link. In the case that the device that transmits the first message frame corresponds to the access point, the initiator address may refer to the AP MLD address; and in the case that the device that transmits the first message frame corresponds to the station, the initiator address may refer to the non-AP STA MLD address. In some embodiments, the initiator address is present in the first message frame; for example, the initiator address may be omitted in the case that there is only a single initiator.

According to some embodiments of the present disclosure, the link identification (Link ID) may correspond to an identification bit of a link to be deleted to which at least one TID is mapped. For example, the link to be deleted to which at least one TID is mapped, may be all links or partial links.

Although a link identification (Link ID) is shown in Table 1, the present disclosure is not limited to this. At least one link identification may exist in the first message frame, or the link identification is a link group identification.

Referring to FIG. 1, it is assumed that the first TID may be mapped to Link 1 and Link 2, the second TID may be mapped to Link 3, and Link 1 to Link 3 respectively have corresponding identification bits. When the links to which the first TID are mapped and the link to which the second TID is mapped are to be deleted, the first message frame may carry three link identifications, which respectively refer to the identification bits of Link 1 to Link 3. However, this is an example, and the present disclosure is not limited to this. For example, when all links are to be deleted, the link identification may be omitted, and all links supported by the address are deleted through the initiator address. When all links to which the first TID is mapped are to be deleted, the first message frame may carry two link identifications, which respectively refer to the identification bits of Link 1 and Link 2. When partial links (e.g., Link 1) to which the first TID is mapped are to be deleted, the first message frame may carry a link identification that indicates Link 1. When the link to which the second TID is mapped is to be deleted, the first message frame may carry a link identification that indicates Link 3. When partial links (e.g., Link 1) to which the first TID is mapped and the link to which the second TID is mapped are to be deleted, the first message frame may carry two link identifications, which respectively refer to the link identification bits of Link 1 and Link 3. In an example where the link identification is a link group identification, the link identification may be a plurality of bits respectively corresponding to the multiple links. In the case of the above assumption, when the links to which the first TID is mapped are to be deleted, the bits corresponding to the links to which the first TID is mapped in the link group identification may be set to the first value (for example, 1) to indicate that the corresponding links are to be deleted; for example, the link identification may be set to "011" to indicate that Link 1 and Link 2 to which the first TID is mapped are to be deleted.

In another example embodiment of the present disclosure, change of links to which at least one TID is mapped may refer to switching a mapped link to another link in the multiple links. That is, the information indicating change of the links to which the at least one TID is mapped in the first message frame may include information indicating switch (or modification) of the links to which the at least one TID is mapped in the multiple links. In this case, the format of the first message frame may be similar to that described above with reference to Table 1, where the link identification (Link ID) in Table 1 may refer to the identification of the link to be switched. For example, according to some embodiments of the present disclosure, the first message frame may include at least one of the following: an identification bit (ID), used for identifying the type of the first message frame; an initiator address, used for identifying the address of the device that transmits the first message frame; a link identification (Link ID), used for identifying the identification bit of the switched link in the links to which the at least one TID is mapped; and timeout information (Timeout), used for identifying the expiration time of the first message frame. The identification bit (ID), The initiator address, and the timeout information (Timeout) may be similar to the foregoing description, and repeated descriptions are omitted here for brevity. For the link identification (Link ID), for example, the first message frame may carry at least two link identifications, one link identification indicates which links are to be switched, and the other link identification may indicate which link is to be switched to. For example, when Link 3 to which the second TID is mapped is to be switched to Link 1, one link identification may indicate the identification bit of Link 3, and the other link identification may indicate the identification bit of Link 1. However, this is an example, and the present disclosure is not limited to this. For example, the first message frame may carry a link identification with more bits to indicate information about switch of links, respectively.

According to some embodiments of the present disclosure, a frame structure for change (deletion or modification) of the links to which the at least one TID is mapped may be defined, for example, a first message frame (tear down frame) described with reference to Table 1. The content of the first message frame may include: an identification bit, identifying that the transmitted first message frame is a tear down frame, or the transmitted first message frame is an action frame, in which an order identifies the tear down frame; an initiator address, which is an MLD address, where the initiator may be a non-AP MLD or an AP MLD; and (in some examples), identifications of the mapped links ((all links or partial links) that are deleted or changed; and (in some examples) timeout information, identifying a tear down expiration time.

According to some embodiments of the present disclosure, the initiator is an AP MLD, and the AP MLD may change or delete the situation that the TID is mapped to the links according to a load situation of each link, or may change or delete the situation that the TID is mapped to the links according to a latency situation of the upper layer data. For the deletion action, the AP MLD may initiate a change after the service transmission corresponding to the corresponding TID is completed; or, for the switch action, the AP MLD may initiate a change during the service transmission process.

According to some embodiments of the present disclosure, the initiator is a non-AP STA MLD, and after data transmission corresponding to the TID is completed, the non-AP STA MLD may initiate change or deletion of the links to which the TID is mapped. For example, a BA (Block ACK) mechanism may be used to transmit the service corresponding to the TID. Then, after receiving the BA (Block ACK or ACK) corresponding to the TID (if it needs to be fed back), change or deletion of the links to which the TID is mapped may be initiated (i.e., executing the method for communication shown in FIG. 2).

Figure 3:
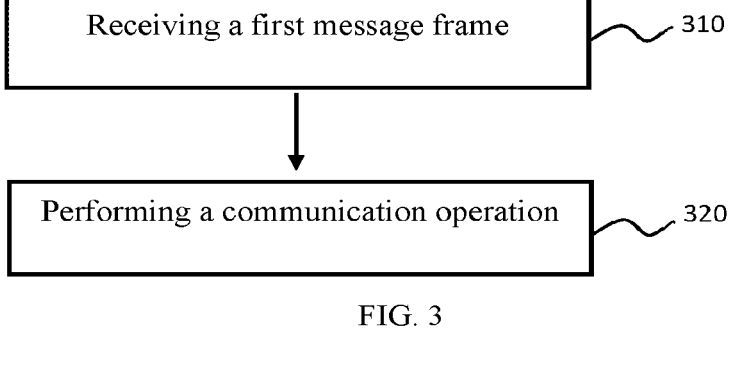
FIG. 3 is a flowchart illustrating another method for communication according to some embodiments of the present disclosure.

FIG. 3 is a flowchart illustrating another method for communication according to some embodiments. The method for communication shown in FIG. 3 may be applied to the operation of the recipient, and the recipient may support multiple links (hereinafter referred to as "multi-link"). In the case that the initiator may be one of an access point multi-link device (AP MLD) or a station multi-link device (non-AP STA MLD), the recipient may be the other of the AP MLD or the non-AP STA MLD.

Referring to FIG. 3, in step 310, a first message frame is received. For example, the first message frame may be received under any link of the multiple links. According to some embodiments of the present disclosure, the first message frame includes information indicating change of links to which at least one TID is mapped. According to some embodiments of the present disclosure, the first message frame may be received from a multi-link access point device (AP MLD), where the information indicating change of the links to which the at least one TID is mapped in the first message frame is determined by the AP MLD according to the load situation of each link in the multiple links and/or the latency situation of the upper-layer data. According to some embodiments of the present disclosure, the first message frame may be received from the multi-link station device after the data transmission corresponding to the at least one TID is completed.

According to some embodiments of the present disclosure, the information indicating change of the links to which the at least one TID is mapped in the first message frame may include information indicating deletion of the links to which the at least one TID is mapped. According to some embodiments of the present disclosure, the information indicating change of the links to which the at least one TID is mapped in the first message frame may include information indicating switch of the links to which the at least one traffic identification (TID) is mapped in the multiple links.

According to some embodiments of the present disclosure, the first message frame may include at least one of the following:

an identification bit, used for identifying the type of the first message frame;

an initiator address, used for identifying an address of a device that transmits the first message frame;

a link identification, used for identifying a link to be deleted or switched in the links to which the at least one traffic identification (TID) is mapped;

timeout information, used for identifying an expiration time of the first message frame.

The first message frame received in step 310 and the information included in the first message frame may be similar to those described above with reference to FIG. 2 and Table 1, and the repeated description is omitted here for brevity.

In step 320, a communication operation may be performed according to the first message. For example, the recipient may change or delete the links to which the at least one TID is mapped according to the information included in the first message frame, so as to, for example, perform service transmission corresponding to other TIDs.

Figure 4:
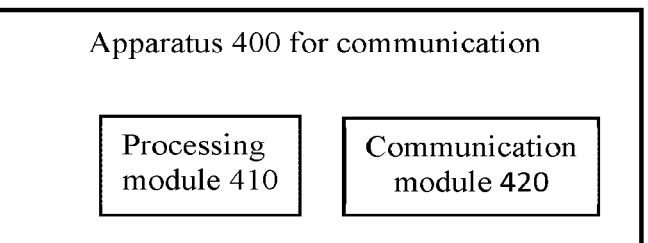
FIG. 4 is a block diagram illustrating an apparatus for communication according to some embodiments of the present disclosure.

FIG. 4 is a block diagram illustrating an apparatus 400 for communication according to some embodiments of the present disclosure.

Referring to FIG. 4, the apparatus 400 for communication may include a processing module 410 and a communication module 420, and the apparatus for communication shown in FIG. 4 may be applied to a device that supports multi-link communications.

According to some embodiments, the apparatus 400 for communication shown in FIG. 4 may be applied to an initiator device that supports multi-link communications. In this case, the processing module 410 may be configured to determine a first message frame, where the first message frame may include information indicating change of links to which at least one TID is mapped; and the communication module 420 may be configured to transmit the first message frame. For example, in the case that the initiator is an access point multi-link device, the processing module 410 of the access point multi-link device may determine, according to the load situation of each link in the multiple links and/or the latency situation of the upper-layer data, information indicating change of the links to which the at least one TID is mapped. For example, in the case that the initiator is a station multi-link device, the processing module 410 of the station multi-link device may control the communication module 420 to transmit the first message frame after the data transmission corresponding to the at least one TID is completed. That is, the apparatus 400 for communication may perform the method for communication described with reference to FIG. 2, and the repeated description is omitted here for brevity.

The apparatus 400 for communication shown in FIG. 4 is applied to a recipient device that supports multi-link communications. In this case, the communication module 420 may be configured to receive a first message frame, where the first message frame includes information indicating change of links to which at least one TID is mapped; and the processing module 410 may be configured to perform a communication operation according to the first message. In this case, the apparatus 400 for communication may perform the method for communication described with reference to FIG. 3, and the repeated description is omitted here for brevity.

According to some embodiments of the present disclosure, the information indicating change of the links to which the at least one TID is mapped in the first message frame may include information indicating deletion of the links to which the at least one TID is mapped. According to some embodiments of the present disclosure, the information indicating change of the links to which the at least one TID is mapped in the first message frame may include information indicating switch of the links to which the at least one traffic identification (TID) is mapped in the multiple links.

According to some embodiments of the present disclosure, the first message frame may include at least one of the following:

an identification bit, used for identifying the type of the first message frame;

an initiator address, used for identifying an address of a device that transmits the first message frame;

a link identification, used for identifying a link to be deleted or switched in the links to which the at least one traffic identification (TID) is mapped;

timeout information, used for identifying an expiration time of the first message frame.

The first message frame involved in the embodiment of FIG. 4 and the information included in the first message frame may be similar to those described above with reference to FIG. 2 and Table 1, and the repeated description is omitted here for brevity.

In addition, the apparatus 400 for communication shown in FIG. 4 is an example, and the embodiments of the present disclosure are not limited to this. For example, the apparatus 400 for communication may further include other modules, such as a memory module or the like. In addition, various modules in the apparatus 400 for communication may be combined into more complex modules, or may be divided into more separate modules.

In the method for communication and the apparatus for communication under the multiple links according to the embodiments of the present disclosure, multiple links to which the TID is mapped can be changed (deleted or modified) by defining the structure of the first message frame (for example, a tear down frame), thus avoiding continuing to map the TID to a high load link, reducing the power consumption of the device, and improving the spectrum utilization rate.

Based on the same principle as the method provided in the embodiments of the present disclosure, an embodiment of the present disclosure further provides an electronic apparatus, and the electronic apparatus includes a processor and a memory; where a machine-readable instruction (also referred to as a "computer program") is stored in the memory; the processor is configured to execute the machine-readable instruction to implement the method described with reference to FIG. 2 and FIG. 3.

An embodiment of the present disclosure further provides a computer-readable storage medium, where the computer-readable storage medium stores a computer program, and when the computer program is executed by a processor, the method described with reference to FIG. 2 and FIG. 3 is implemented.

In some embodiments, the processor may be used for implementing or executing various exemplary logic blocks, modules, and circuits described in conjunction with content of the present disclosure, such as, a CPU (Central Processing Unit), a general-purpose processor, a DSP (Digital Signal Processor), an ASIC (Application Specific Integrated Circuit), an FPGA (Field Programmable Gate Array), or other programmable logic devices, and transistor logic devices, a hardware component, or any combination of them. The processor may also be a combination of implementing computing functions, for example, a combination of one or more microprocessors, a combination of a DSP and a microprocessor, etc.

In some embodiments, the memory may be, for example, a ROM (Read Only Memory), a RAM (Random Access Memory), an EEPROM (Electrically Erasable Programmable Read-Only Memory), a CD-ROM (Compact Disc Read Only Memory) or other optical storage, a disk storage (including a compact disc, a laser disc, an optical disc, a digital versatile disc, a Blu-ray disc, etc.), a disk storage medium or other magnetic storage devices, or any other medium that can be used to carry or store program code in the form of instructions or data structures and can be accessed by computers, but is not limited to this.

It should be understood that although the steps in the flowchart of the drawings are sequentially displayed according to the indication of the arrows, these steps are not necessarily performed sequentially in the order indicated by the arrows. Unless explicitly stated here, the execution of these steps is not strictly limited in order, which may be performed in other orders. In addition, at least a portion of the steps in the flowchart of the drawings may include a plurality of sub-steps or stages, these sub-steps or stages are not necessarily performed at the same moment, but may be executed at different moments, and the execution sequence of them is not necessarily performed in sequence, but may be performed alternately or alternately with other steps or sub-steps of other steps or at least a portion of stages.

Although the present disclosure has been shown and described with reference to certain embodiments of the present disclosure, it will be understood by those skilled in the art that various changes may be made in form and detail without departing from the scope of the present disclosure. Therefore, the scope of the present disclosure should not be limited to the embodiments, but should be defined by the appended claims and their equivalents.

What is claimed is:

1. A method for communication in multi-links, the method for communication comprising:

determining a first message frame in a link of the multi-links, wherein the first message frame comprises information indicating change of links to which at least one traffic identification (TID) is mapped, and the first message frame further comprises expiration information used for identifying an expiration time of the first message frame; and transmitting the first message frame;

wherein determining the first message frame comprises:

determining the information indicating change of the links to which the at least one traffic identification (TID) is mapped by an access point multi-link device according to a load situation of each link in the multi-links and/or a latency situation of upper-layer data, wherein an initiator is the access point multi-link device.

2. The method for communication according to claim 1, wherein the information indicating change of the links to which the at least one traffic identification (TID) is mapped comprises information indicating deletion of the links to which the at least one traffic identification (TID) is mapped.

3. The method for communication according to claim 2, wherein the first message frame further comprises at least one of following:

an identification bit, used for identifying a type of the first message frame;

an initiator address, used for identifying an address of a device that transmits the first message frame; or a link identification, used for identifying an identification bit of a link to be deleted in the links to which the at least one traffic identification (TID) is mapped.

4. The method for communication according to claim 1, wherein the information indicating change of the links to which the at least one traffic identification (TID) is mapped comprises information indicating switch of the links to which the at least one traffic identification (TID) is mapped in the multi-links.

5. The method for communication according to claim 1, wherein transmitting the first message frame comprises:

transmitting the first message frame by a station multi-link device after data transmission corresponding to the at least one traffic identification (TID) is completed, wherein an initiator is the station multi-link device.

6. A method for communication in multi-links, the method for communication comprising:

receiving a first message frame, wherein the first message frame comprises information indicating change of links to which at least one traffic identification (TID) is mapped, and the first message frame further comprises expiration information used for identifying an expiration time of the first message frame; and performing a communication operation according to the first message frame;

wherein the first message frame is received from an access point multi-link device; the information indicating change of the links to which the at least one traffic identification (TID) is mapped is determined by the access point multi-link device according to a load situation of each link in the multi-links and/or a latency situation of upper-layer data.

7. The method for communication according to claim 6, wherein the information indicating change of the links to which the at least one traffic identification (TID) is mapped comprises at least one of:

information indicating deletion of the links to which the at least one traffic identification (TID) is mapped; or information indicating switch of the links to which the at least one traffic identification (TID) is mapped in the multi-links.

8. The method for communication according to claim 7, wherein the first message frame further comprises at least one of following:

an identification bit, used for identifying a type of the first message frame;

an initiator address, used for identifying an address of a device that transmits the first message frame; or a link identification, used for identifying a link to be deleted in the links to which the at least one traffic identification (TID) is mapped.

9. The method for communication according to claim 6, wherein the first message frame is received from a station multi-link device after data transmission corresponding to the at least one traffic identification (TID) is completed.

10. An electronic apparatus, comprising a memory, a processor, and a computer program stored on the memory and executable on the processor; wherein, when the processor executes the computer program, a method for communication in multi-links is implemented, the method for communication comprising:

determining a first message frame in a link of the multi-links, wherein the first message frame comprises information indicating change of links to which at least one traffic identification (TID) is mapped, and the first message frame further comprises expiration information used for identifying an expiration time of the first message frame; and transmitting the first message frame;

wherein determining the first message frame comprises:

determining the information indicating change of the links to which the at least one traffic identification (TID) is mapped by an access point multi-link device according to a load situation of each link in the multi-links and/or a latency situation of upper-layer data, wherein an initiator is the access point multi-link device.

11. An electronic apparatus, comprising a memory, a processor, and a computer program stored on the memory and executable on the processor, wherein, when the processor executes the computer program, the method according to claim 6 is implemented.

12. A non-transitory computer-readable storage medium, wherein a computer program is stored on the computer-readable storage medium, and when the computer program is executed by a processor, the method according to claim 1 is implemented.

13. A non-transitory computer-readable storage medium, wherein a computer program is stored on the computer-readable storage medium, and when the computer program is executed by a processor, the method according to claim 6 is implemented.

14. The electronic apparatus according to claim 10, wherein the information indicating change of the links to which the at least one traffic identification (TID) is mapped comprises information indicating deletion of the links to which the at least one traffic identification (TID) is mapped.

15. The electronic apparatus according to claim 14, wherein the first message frame further comprises at least one of following:

an identification bit, used for identifying a type of the first message frame;

an initiator address, used for identifying an address of a device that transmits the first message frame; or a link identification, used for identifying an identification bit of a link to be deleted in the links to which the at least one traffic identification (TID) is mapped.

16. The electronic apparatus according to claim 10, wherein the information indicating change of the links to which the at least one traffic identification (TID) is mapped comprises information indicating switch of the links to which the at least one traffic identification (TID) is mapped in the multi-links.

17. The electronic apparatus according to claim 10, wherein transmitting the first message frame comprises:

transmitting the first message frame by a station multi-link device after data transmission corresponding to the at least one traffic identification (TID) is completed, wherein an initiator is the station multi-link device.

\* \* \* \* \*